(12) United States Patent
Schleif et al.

(10) Patent No.: US 7,065,889 B2
(45) Date of Patent: Jun. 27, 2006

(54) TOOL AND A METHOD FOR ASSESSING AN INDICATOR MARK POSITION

(75) Inventors: Kurt Schleif, Dearborn, MI (US); Robert Michel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/904,605

(22) Filed: Nov. 18, 2004

(65) Prior Publication Data

US 2006/0101659 A1    May 18, 2006

(51) Int. Cl.
*G01B 11/26* (2006.01)

(52) U.S. Cl. .................. 33/286; 33/DIG. 21

(58) Field of Classification Search ............ 33/227, 33/286, 288, 600, DIG. 21, 613, 645
See application file for complete search history.

(56) References Cited

U.S. PATENT DOCUMENTS

| | | | | |
|---|---|---|---|---|
| 4,907,881 A | * | 3/1990 | Jones | 33/286 |
| 5,539,990 A | * | 7/1996 | Le | 33/286 |
| 5,588,216 A | * | 12/1996 | Rank et al. | 33/286 |
| 5,819,424 A | * | 10/1998 | Ohtomo et al. | 33/227 |
| 5,836,081 A | * | 11/1998 | Orosz, Jr. | 33/DIG. 21 |
| 5,864,956 A | * | 2/1999 | Dong | 33/227 |
| 6,823,600 B1 | * | 11/2004 | Vaughan | 33/288 |
| 6,826,841 B1 | * | 12/2004 | Liao | 33/286 |
| 2001/0029675 A1 | * | 10/2001 | Webb | 33/286 |
| 2002/0059735 A1 | * | 5/2002 | Ponce | 33/760 |
| 2002/0066191 A1 | * | 6/2002 | Hsu | 33/286 |
| 2005/0172502 A1 | * | 8/2005 | Sergyeyenko et al. | 33/286 |

* cited by examiner

*Primary Examiner*—G. Bradley Bennett

(74) *Attorney, Agent, or Firm*—Frank A. MacKenzie

(57) ABSTRACT

A tool for assessing the position of an indicator mark disposed on a seat of a vehicle. The tool includes an arm adapted to contact an anchorage and a plurality of lasers adapted to project a set of beams toward the seat. The set of beams define an area indicative of a desired location of the indicator mark.

20 Claims, 3 Drawing Sheets

TOOL AND A METHOD FOR ASSESSING AN INDICATOR MARK POSITION

BACKGROUND OF THE INVENTION

1. Field of the Invention

The present invention relates to a tool and a method for assessing a position of an indicator mark disposed on a vehicle surface, and more particularly to a tool and a method for assessing the position of a child restraint anchorage indicator mark disposed on a seat of a vehicle.

2. Background Art

Motor vehicles may include a child restraint anchorage system. A child restraint anchorage system uses a plurality of anchorages to transfer loads from a child safety seat to the vehicle structure. Such anchorages may be located where they are partially concealed by or recessed from the exterior surfaces of a vehicle seat. Manufacturer, industry, or government standards may require that an indicator mark be employed to conspicuously identify the location of an anchorage. Moreover, such standards may establish where the indicator mark must be located.

The position of an indicator mark may vary due to the dimensional tolerances of vehicle, seating, and anchorage system components. Accurately assessing the location of an indicator mark is difficult not only due to tolerance variations, but also due to the complex surface geometries and contours of interior vehicle surfaces. In addition, Applicants of the present invention have discovered that it is difficult to assess the location of an indicator mark disposed on a deformable surface, such as a vehicle seat, since a tool may deform or reshape the seat, thereby altering the position of the indicator mark.

Before applicant's invention, there was a need for a tool and a method for accurately determining the position of a child restraint anchorage indicator mark. In addition, there was a need for an apparatus and a method that could be used with various child restraint anchorage designs and configurations. Moreover, there was the need for a tool that could accommodate vehicle and component tolerances and dimensional variations. In addition, there was a need for a tool that could assess an indicator mark position without altering the indicator mark location or orientation. Also, there was the need for a tool and a method that could be used to quickly and cost effectively assess indicator mark locations. Furthermore, there was a need for an easy to use, ergonomically designed tool that reduces training time and associated costs. Problems associated with the prior art as noted above and other problems are addressed by applicant's invention as summarized below.

SUMMARY OF THE INVENTION

According to one aspect of the present invention, a tool for assessing the position of an indicator mark disposed on a seat of a vehicle is provided. The tool includes an arm and a plurality of line generating lasers. The arm is adapted to contact an anchorage disposed proximate the seat. The plurality of line generating lasers are associated with the arm and are adapted to project a set of beams toward the seat. The set of beams define an area indicative of a desired location of the indicator mark. The set of beams permit the position of the indicator mark to be quickly and easily assessed without altering the location or orientation of the indicator mark.

Each member of the set of beams may intersect at least one other member of the set of beams. The plurality of line generating lasers may be configured to project a first pair and a second pair of parallel beams. The first and second pairs of parallel beams may intersect.

The tool may include a level positioned at a predetermined angle relative to the set of beams.

The arm may include a slot adapted to engage the anchorage. The slot may include a hook portion adapted to receive the anchorage and disposed in a different direction than an adjacent portion of the slot. The slot and hook portion permit the tool to be used with a variety of anchorage designs and configurations.

The tool may include a mounting assembly connected to the arm and adapted to receive the plurality of line generating lasers. The mounting assembly may include an adjustment feature to adjust the position of a line generating laser. The mounting assembly may include a handle portion. The handle portion improves tool ergonomics when grasping and positioning the tool.

According to another aspect of the present invention, a tool for assessing the position of a child restraint anchorage indicator mark disposed on a seat of a vehicle is provided. The tool includes an arm, a set of lasers, a mounting assembly, and a level. The arm includes a slot configured to receive an anchorage. Each member of the set of lasers is adapted to project a beam. The mounting assembly is adapted to receive the set of lasers and is disposed proximate the arm. The level is disposed at a predetermined angle relative to the set of lasers. The level indicates when the tool is positioned at a desired angle for projecting the beams.

The beams may define an area indicative of a desired location of the child restraint anchorage indicator mark. The beams projected by each member of the set of lasers may be linear beams that intersect at least one other linear beam.

The arm may be adapted to be decoupled from the mounting assembly. The arm may include a fixed portion and a moveable portion. The fixed portion may be attached to the mounting assembly. The moveable portion may be adjustably positioned relative to the fixed portion and may include the slot. The arm may include an adjustment mechanism adapted to position the moveable portion relative to the fixed portion when the adjustment mechanism is actuated.

The level may be disposed in a recessed portion of the mounting assembly. The mounting assembly may include an adjustment feature associated with a member of the set of lasers. The adjustment feature may be adapted to adjust the orientation of an associated member of the set of lasers relative to the mounting assembly.

According to another aspect of the present invention, a method for assessing the position of a child restraint anchorage indicator mark disposed on a seat of a vehicle with an assessment tool is provided. The assessment tool includes an arm adapted to engage an anchorage and a plurality of lasers adapted to project a set of linear beams.

The method includes the steps of engaging the arm to the anchorage, positioning the tool at a predetermined angle, projecting the linear beams toward the seat, and determining whether the indicator mark is within an area defined by the linear beams.

The arm may include a moveable portion and the step of engaging the arm to the anchorage may include adjusting the moveable portion to fit the anchorage.

DETAILED DESCRIPTION OF THE PREFERRED EMBODIMENT(S)

Figure 1:
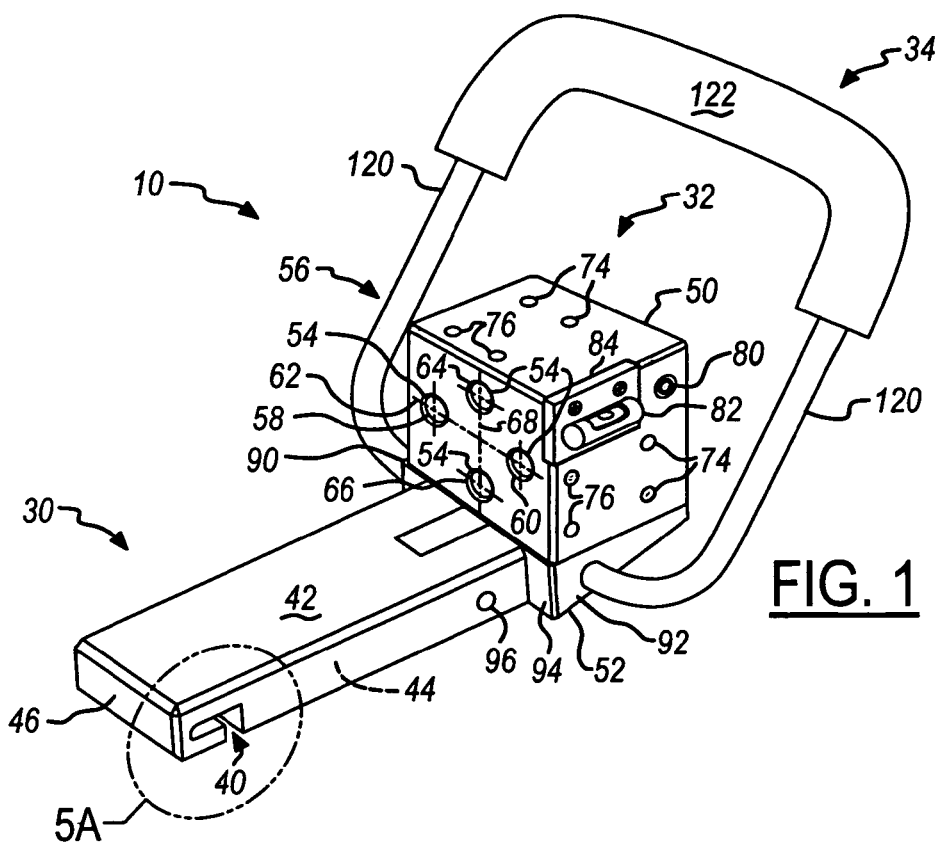
FIG. 1 is a perspective view of a tool for assessing the position of an indicator mark disposed on a seat of a vehicle.
Figure 2:
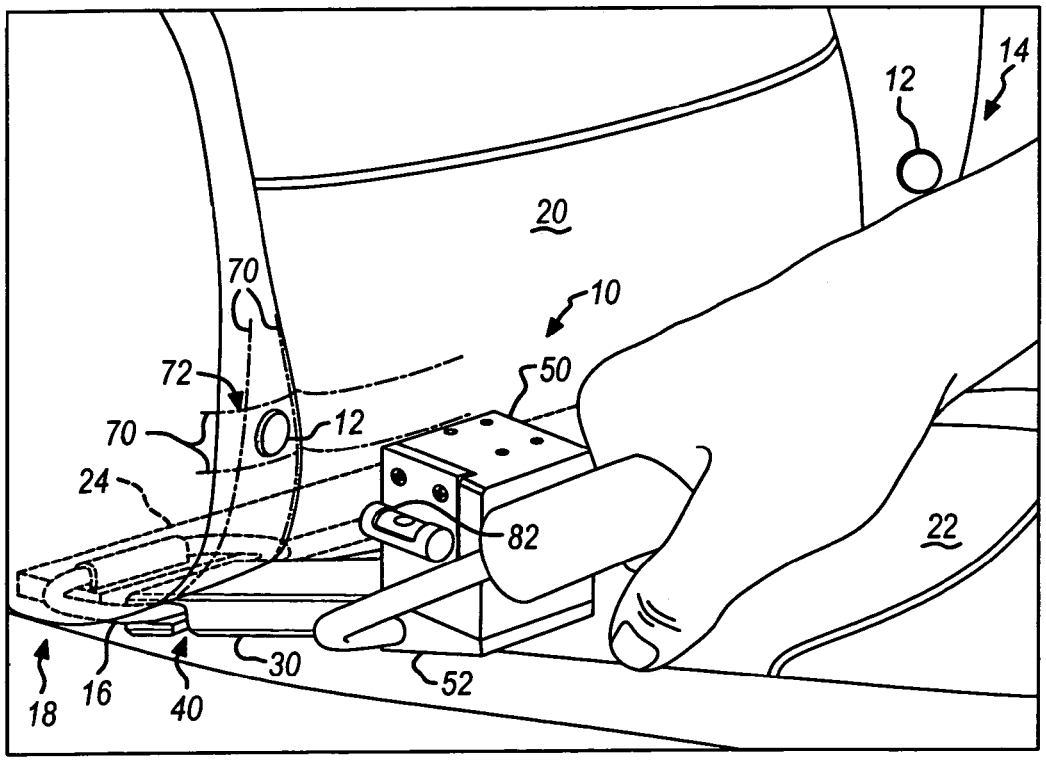
FIG. 2 is an exemplary perspective view of the tool projecting a plurality of laser beams onto the seat.

Referring to FIGS. 1 and 2, a tool 10 for assessing a position of an indicator mark 12 disposed on a vehicle seat 14 is provided. The indicator mark 12 conspicuously identifies the approximate location of an anchorage 16 of a child restraint anchorage system 18. The indicator mark 12 may be of any suitable type and may include one or more words, symbols, or pictograms. For example, the indicator mark 12 may be configured as a button disposed on a seat back 20 or seat bottom 22 of the vehicle seat 14.

The anchorage 16 is adapted to receive a component of a child restraint system, such as a mating feature of a child safety seat or a tether strap. The anchorage 16 is adapted to transmit force from the child restraint system to the vehicle. In the embodiment shown, the anchorage 16 is coupled to a bracket 24 that is disposed on a portion of the vehicle. Alternatively, the bracket 24 may be omitted and the anchorage 14 may be attached to another vehicle component, such as a vehicle seat frame.

The tool 10 includes an arm 30 and a mounting assembly 32. In addition, the tool 10 may include a handle assembly 34.

The arm 30 includes a slot 40 adapted to receive the anchorage 16. More specifically, the slot 40 may be disposed proximate a top surface 42, bottom surface 44, or an end surface 46 of the arm 30. In the embodiment shown in FIG. 1, the slot is disposed proximate the bottom surface 44.

Figure 3A:
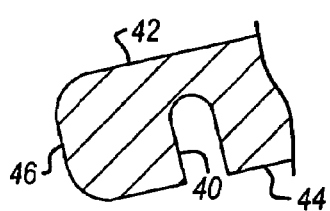
FIGS. 3A–3L are section views of various embodiments of a slot of the arm.
Figure 3E:
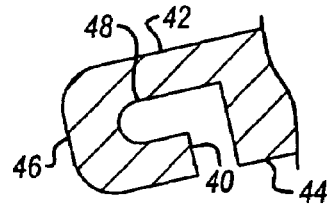
Figure 3I:
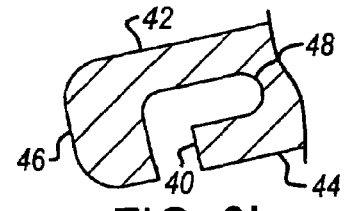
Figure 3B:
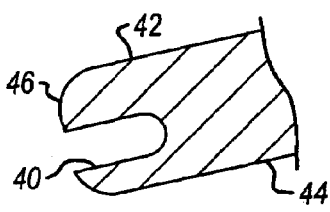
Figure 3F:
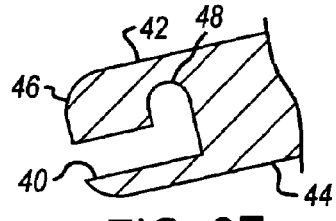
Figure 3J:
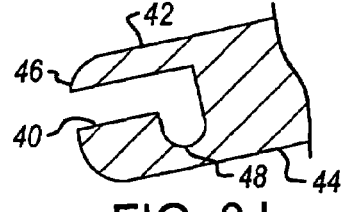
Figure 3C:
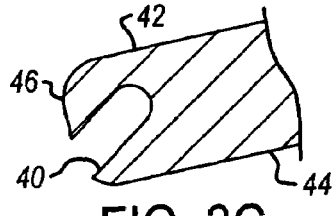
Figure 3G:
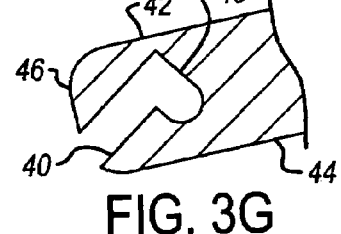
Figure 3K:
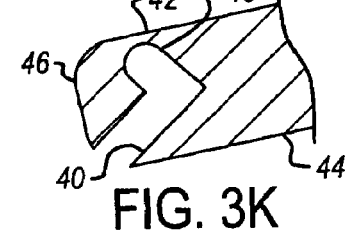
Figure 3D:
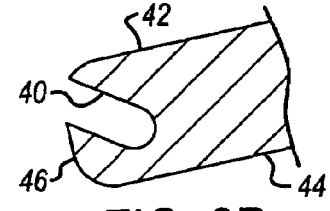
Figure 3H:
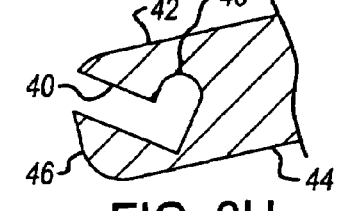
Figure 3L:
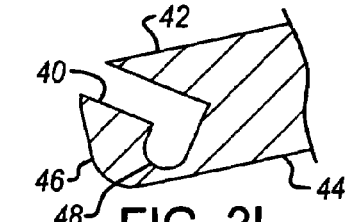

The slot 40 may have any suitable configuration. Referring to FIGS. 3A–3L, various slot embodiments are shown. Reference numbers are repeated for convenience and clarity. In FIGS. 3A–3D, the slot 40 has generally linear configuration. Moreover, the slot 40 may be disposed perpendicular to a surface of the arm 30 as shown in FIGS. 3A–3B or may be non-perpendicular as shown in FIGS. 3C–3D. Alternatively, the slot 40 may have a nonlinear configuration. For instance, the slot 40 may include a curved surface or may include hook portion 48 that is disposed in a different direction than an adjacent portion of the slot 40 as shown in FIGS. 3E–3L. The hook portion 48 facilitates engagement and seating of the anchorage 16 within or against the slot 40. In addition, the slot 40 or hook portion 48 permit the tool 10 to be rotated about the anchorage 16 to position the tool 10 as will be described in more detail below.

The mounting assembly 32 is disposed proximate the arm 30. In the embodiment shown in FIG. 1, the mounting assembly 32 includes a mounting block 50 and an angle block 52.

The mounting block 50 is configured to receive one or more lasers 54. In the embodiment shown in FIG. 1, the mounting block 50 includes a plurality of apertures 56, each aperture being adapted to receive a laser 54. The apertures 56 may be disposed in any suitable configuration. In the embodiment shown in FIG. 1, the apertures 56 are disposed in pairs along perpendicular axes. More specifically, a first aperture 58 and a second aperture 60 are disposed along a first axis 62 and a third aperture 64 and fourth aperture 66 are disposed along a second axis 68.

The lasers 54 may be of any suitable type. For example, the one or more lasers may be a line projecting or line generating laser adapted to project a linear beam. For example, a 650 Nm 1 mW model ULL5-1G-650-90 line projecting laser manufactured by World Star Tech may be employed.

The beams 70 projected by the lasers 54 define a region or area denoting a desired indicator mark 12 location. In the embodiment shown in FIG. 4, the four line projecting lasers 54 project intersecting beams 70 that define a generally rectangular area 72 denoting the desired position of the indicator mark 12. Alternatively, any suitable number of lasers may be employed. For instance, three lasers could be used to project beams that define a triangular area.

The mounting block 50 may also include one or more adjustment features associated with each laser 54. In the embodiment shown in FIG. 1, a first adjustment feature 74 and a second adjustment feature 76 are associated with each laser 54. The first adjustment feature 74 is adapted to secure a laser 54 in its associated aperture 56. The second adjustment feature 76 is adapted to fine tune the positioning of the laser 54 or optionally to adjust the quality of the projected beam. The first and second adjustment features 74,76 may be adjustment screws disposed in the mounting block 50. The adjustment screw may be rotated to advance or retract the adjustment screw relative to the laser 54.

The mounting block 50 may also include a plug 80 for receiving power from a remote power source. Optionally, a power source may be incorporated with the tool 10.

The tool 10 may also include a level 82 disposed at a predetermined angle relative to the lasers 54 and/or beams 70. The level 82 may indicate when the tool 10 is positioned at a desired angle for projecting the beams. The level 82 may be of any suitable type, such as a bubble level, and may be disposed in any suitable location. In the embodiment shown, the level 82 is disposed on the mounting block 50. In addition, the level 82 may be received in a notch or recessed portion 84 of the mounting block 50 to help insure that the level 82 is mounted at the proper orientation relative to the lasers 54 and/or beams 70.

The angle block 52 may be disposed proximate the arm 30 and the mounting block 50. The angle block 52 may have any suitable configuration and may be made of any suitable material. In the embodiment shown in FIG. 1, the angle block 52 includes a top surface 90, a bottom surface 92, and a front surface 94. The top surface 90 is disposed proximate the mounting block 50 and at an angle relative to the bottom surface 92. The angle may be selected to project the beams 70 at a desired angle relative to the arm 30, slot 40, and/or anchorage 16. Alternatively, the lasers 54 may be mounted at an angle within the mounting block 50.

The arm 30 and mounting assembly 32 may be integrally formed or connected in any suitable manner, such as by welding, fasteners, or an adhesive. In the embodiment shown in FIG. 1, the arm 30 is coupled to the mounting assembly 32 with a pin 96. This embodiment permits different arms to be attached to the mounting assembly 32 to accommodate different anchorage configurations.

Figure 4A:
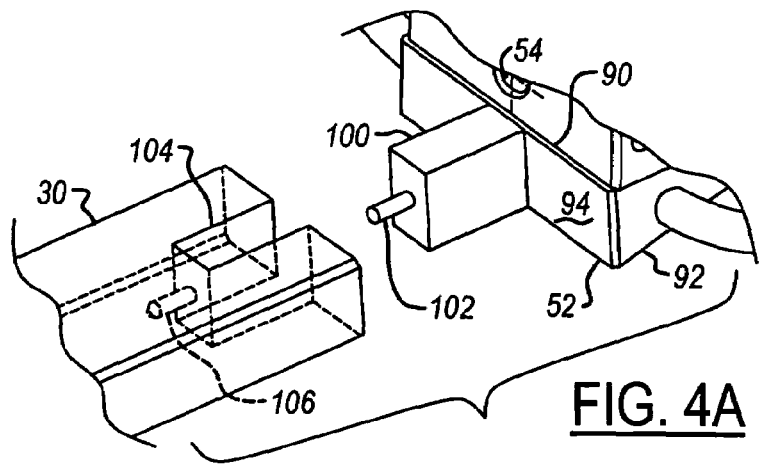
FIG. 4A is an exploded perspective view of one embodiment of an arm coupling portion of the tool.
Figure 4B:
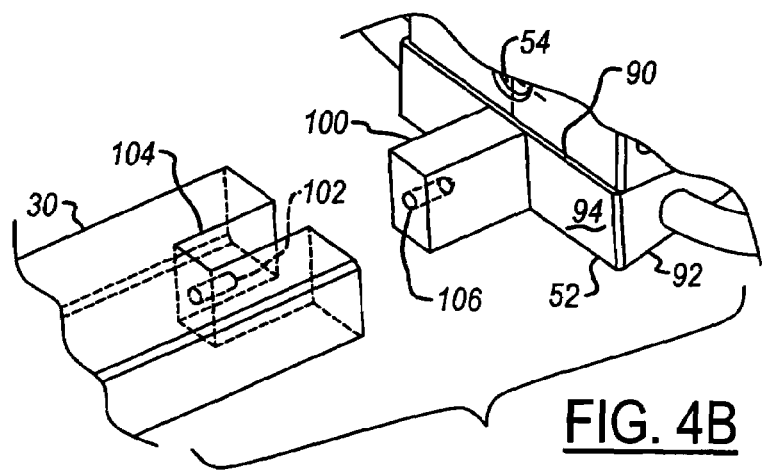
FIG. 4B is an exploded perspective view of another embodiment of the arm coupling portion of the tool.

Referring to FIGS. 4A and 4B, two alternate embodiments of an arm coupling portion of the tool 10 are shown. In FIG. 4A, the angle block 52 includes a tab 100 having a pin 102 and the arm 30 includes a tab slot 104 having an aperture 106 adapted to receive the pin 102. Alternatively, the tab 100 may include an aperture 106 and the tab slot 104 may have a pin 102 as shown in FIG. 4B. In addition, the tab and tab slot may be exchanged such that the tab is associated with the arm 30 and the tab slot is associated with the mounting assembly 32 in any embodiment.

Figure 5:
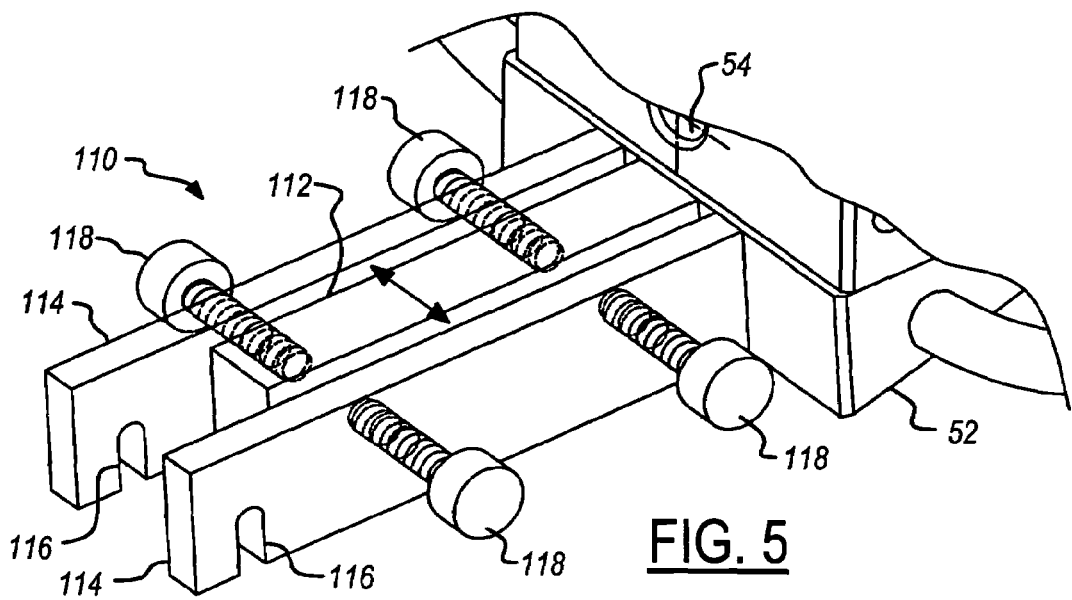
FIG. 5 is a perspective view of an embodiment of an adjustable arm.

Referring to FIG. 5, an alternate embodiment of the arm is shown. In this embodiment, the arm 110 includes a fixed portion 112 and one or more moveable portions 114. This embodiment provides flexibly to accommodate different anchorage designs with a single arm assembly. Moreover, this embodiment allows the arm to be adjusted to inhibit lateral movement and thereby more precisely position the tool.

The fixed portion 112 is attached to or integrally formed with the mounting assembly 32. In the embodiment shown in FIG. 5, the fixed portion 112 is attached to the angle block 52.

The moveable portions 114 include slots 116 adapted to receive the anchorage 16. The slots 116 may have any suitable configuration as previously described. In addition, the slots 116 may be coaxially disposed to facilitate engagement with the anchorage 16.

The moveable portions 114 are moveably coupled to the fixed portion 112 or mounting assembly 32 with one or more adjustment mechanisms 118. In the embodiment shown, the adjustment mechanisms 118 are threaded fasteners that may be rotated to independently position the moveable portions 114 relative to the fixed portion 112. For example, the adjustment mechanisms 118 may be threaded into the fixed portion 112 to position the moveable portion 114 closer to the fixed portion 112 and rotated in the opposite direction to position the moveable portion 114 further away from the fixed portion 112.

Referring again to FIG. 1, the handle assembly 34 is shown in more detail. The handle assembly 34 includes one or more mounting members 120 and a grip portion 122. The handle assembly 34 is configured to allow an operator to grasp the grip portion 122 to support and position the tool 10.

The mounting members 120 may be attached to the arm 30 or the mounting assembly 32 in any suitable manner, such as by welding, fasteners, or an adhesive. In the embodiment shown in FIG. 1, the mounting members 120 are disposed proximate the angle block 52.

The grip portion 122 may be disposed at any suitable angle so as not to interfere with the projection of the beams 70 or engagement with the anchorage 16. In the embodiment shown, the grip portion 122 is also positioned to facilitate visibility of the level 82.

Figure 6:
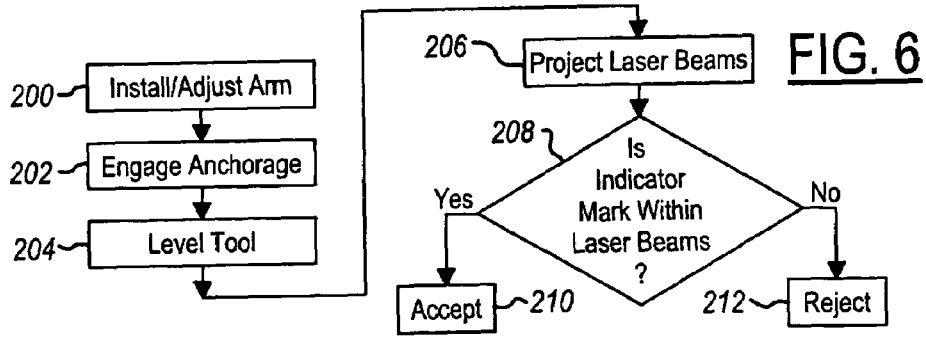
FIG. 6 is a flowchart of a method for assessing the position of an indicator mark with the tool.

Referring to FIG. 6, a method for assessing the position of a child restraint anchorage indicator mark disposed on a vehicle seat will now be described.

At 200, the tool is configured to accommodate the anchorage. More specifically, if the tool is adjustable as shown in FIG. 5, the moveable portion is adjusted to fit the anchorage as previously described. If the tool is configured with a removable arm, an appropriate arm is installed that is compatible with the anchorage.

At 202, the tool is positioned to engage the anchorage. More specifically, an operator grasps the tool using the handle assembly and positions the tool such that the slot engages the anchorage. The slot is engaged with the anchorage when the anchorage is seated against the end of the slot. In addition, a portion of the arm may contact the seat back and/or seat bottom when engaged with the anchorage.

At 204, the tool is positioned at a desired angle. The tool is positioned by rotating the tool about the anchorage until the level indicates that the desired angle is attained. For example, the tool may be rotated until the level indicates a horizontal position. Since the level is disposed at a predetermined angle relative to the laser and/or beams, the beams will be projected at a desired orientation toward the seat.

At 206, the lasers are activated to project the beams. The beams may be projected in a pattern that defines an area indicative of a desired location of the indicator mark. For example, the beams may be projected in a grid pattern, such as may be created by the intersection of two sets of parallel beams.

At 208, the position of the indicator mark is assessed. More specifically, the position of the indicator mark is compared to the projected beams. If the indicator mark is within the area defined by the beams, then the position of the indicator mark is acceptable as shown in block 210. If the indicator mark or a portion thereof is contacted by or not within the area defined by the beams, then the position of the indicator mark is not acceptable as shown in block 212.

The present invention permits the position of an indicator mark to be assessed without affecting the location or orientation of the indicator mark. In addition, the present invention permits the position of an indicator mark to be quickly and accurately assessed. Moreover, the present invention may be reconfigured to accommodate different anchorage designs, thereby eliminating the need for multiple customized tools.

While the best mode for carrying out the invention has been described in detail, those familiar with the art to which this invention relates will recognize various alternative designs and embodiments for practicing the invention as defined by the following claims.

What is claimed is:

1. A tool for assessing a position of a indicator mark disposed on a seat of a vehicle, the tool comprising:
    an arm that receives an anchorage disposed proximate the seat; and
    a plurality of line generating lasers associated with the arm and adapted to project a set of beams toward the seat;
    wherein the set of beams define an enclosed area indicative of a desired location of the indicator mark.

2. The tool of claim 1 wherein each member of the set of beams intersects at least two other members of the set of beams.

3. The tool of claim 1 wherein the plurality of line generating lasers are configured to project a first pair and a second pair of parallel beams.

4. The tool of claim 3 wherein the first and second pairs of parallel beams intersect.

5. The tool of claim 1 further comprising a level positioned at a predetermined angle relative to the set of beams.

6. The tool of claim 1 wherein the arm further comprises a slot adapted to engage the anchorage.

7. The tool of claim 6 wherein the slot includes a hook portion adapted to receive the anchorage and disposed in a different direction than an adjacent portion of the slot.

8. The tool of claim 1 further comprising a mounting assembly connected to the arm and adapted to receive the plurality of line generating lasers.

9. The tool of claim 8 wherein the mounting assembly further comprises an adjustment feature adapted to adjust the position of a line generating laser.

10. The tool of claim 8 wherein the mounting assembly further comprises a handle portion.

11. A tool for assessing a position of a child restraint anchorage indicator mark disposed on a seat of a vehicle, the tool comprising:
- an arm having a slot configured to receive an anchorage;
- a set of lasers, each member of the set of lasers being adapted to project a beam;
- a mounting assembly adapted to receive the set of lasers and disposed proximate the arm; and
- a level disposed at a predetermined angle relative to the set of lasers;
- wherein the level indicates when the tool is positioned at a desired angle for projecting the beams.

12. The tool of claim 11 wherein the beams define an area indicative of a desired location of the child restraint anchorage indicator mark.

13. The tool of claim 11 wherein the beam projected by each member of the set of lasers is a linear beam that intersects at least one other linear beam.

14. The tool of claim 11 wherein the arm is adapted to be decoupled from the mounting assembly.

15. The tool of claim 11 wherein the arm includes a fixed portion attached to the mounting assembly and a moveable portion including the slot, the moveable portion being adjustably positionable relative to the fixed portion.

16. The tool of claim 15 further comprising an adjustment mechanism adapted to position the moveable portion relative to the fixed portion when the adjustment mechanism is actuated.

17. The tool of claim 11 wherein the level is disposed in a recessed portion of the mounting assembly.

18. The tool of claim 11 wherein the mounting assembly further comprises an adjustment feature associated with a member of the set of lasers, the adjustment feature being adapted to adjust the orientation of an associated member of the set of lasers relative to the mounting assembly.

19. A method for assessing a position of a child restraint anchorage indicator mark disposed on a seat of a vehicle with an assessment tool, the assessment tool having an arm adapted to engage an anchorage and a plurality of lasers adapted to project a set of linear beams, the method comprising:
- engaging the arm to the anchorage;
- positioning the tool at a predetermined angle;
- projecting the linear beams toward the seat; and
- determining whether the indicator mark is within an area defined by the linear beams.

20. The method of claim 19 wherein the arm further comprises a moveable portion and the step of engaging the arm to the anchorage further comprises adjusting the moveable portion to fit the anchorage.

* * * * *